(12) United States Patent
Yang et al.

(10) Patent No.: US 11,684,127 B2
(45) Date of Patent: Jun. 27, 2023

(54) PLASTIC PRODUCT DISPOSED ON A STRAP

(71) Applicant: Universal Trim Supply Co., Ltd., New Taipei (TW)

(72) Inventors: Shih-Sheng Yang, Taipei (TW); Yen-Po Chuang, New Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 17/691,065

(22) Filed: Mar. 9, 2022

(65) Prior Publication Data
US 2023/0148715 A1    May 18, 2023

(30) Foreign Application Priority Data
Nov. 18, 2021    (CN) .......................... 202122836915.4

(51) Int. Cl.
  *A44B 19/26*    (2006.01)
  *B29C 45/14*    (2006.01)
  *B29L 5/00*    (2006.01)

(52) U.S. Cl.
  CPC ...... *A44B 19/262* (2013.01); *B29C 45/14426* (2013.01); *B29L 2005/00* (2013.01)

(58) Field of Classification Search
  CPC ............ A44B 19/262; B29C 45/14426; B29C 45/1671; B29L 2005/00; Y10T 24/2586
  See application file for complete search history.

(56) References Cited

U.S. PATENT DOCUMENTS

| 2,205,769 | A | * | 6/1940 | Sweetland | ............. | B62K 21/26 |
| | | | | | | 81/492 |
| 5,075,066 | A | * | 12/1991 | Terada | ................. | A44B 19/262 |
| | | | | | | 264/254 |
| 5,347,692 | A | * | 9/1994 | Ebata | ...................... | B29C 45/14 |
| | | | | | | 24/429 |
| 5,690,444 | A | * | 11/1997 | Yuuki | ..................... | F16G 11/14 |
| | | | | | | 24/429 |
| 6,758,997 | B1 | * | 7/2004 | Mao | .................... | B29C 45/1671 |
| | | | | | | 264/254 |
| 6,986,858 | B2 | * | 1/2006 | Yang | ................... | B29C 45/1671 |
| | | | | | | 264/254 |
| 7,234,939 | B2 | * | 6/2007 | Bills | ........................ | A61C 5/42 |
| | | | | | | 433/102 |

(Continued)

*Primary Examiner* — Robert Sandy
*Assistant Examiner* — Louis A Mercado
(74) *Attorney, Agent, or Firm* — Winston Hsu

(57) ABSTRACT

A plastic product disposed on a strap is provided. The strap is a soft string type textile. The plastic product includes a first injection molding portion and a second injection molding portion. The second injection molding portion is combined with the first injection molding portion to form the plastic product. An end portion of the strap protrudes out of the first injection molding portion and is completely covered by the second injection molding portion. A length of the first injection molding portion along a longitudinal direction of the strap is less than a length of the plastic product along the longitudinal direction of the strap. A protruding length of the end portion of the strap protruding out of the first injection molding portion along the longitudinal direction of the strap is less than half of a thickness of the second injection molding portion along a radial direction of the strap.

14 Claims, 9 Drawing Sheets

(56) References Cited

U.S. PATENT DOCUMENTS

| | | | |
|---|---|---|---|
| 8,959,729 B2 * | 2/2015 | Keyaki | E04H 15/322 |
| | | | 24/429 |
| 9,669,572 B2 * | 6/2017 | Chen | B29C 45/14426 |
| 9,743,723 B2 * | 8/2017 | Chang | A44B 19/262 |
| 2005/0022347 A1 * | 2/2005 | Yang | A44B 19/262 |
| | | | 24/429 |
| 2005/0050698 A1 * | 3/2005 | Muratsubaki | A44B 19/262 |
| | | | 24/429 |
| 2009/0265899 A1 * | 10/2009 | Yang | A44B 19/262 |
| | | | 24/429 |
| 2009/0276985 A1 * | 11/2009 | Kim | A44B 19/262 |
| | | | 24/431 |

\* cited by examiner

PLASTIC PRODUCT DISPOSED ON A STRAP

BACKGROUND OF THE INVENTION

1. Field of the Invention

The present invention relates to an injection molding product, and more specifically, to a plastic product disposed on a strap with a better aesthetic appearance and an enhanced combination strength.

2. Description of the Prior Art

A soft strap can be combined with a plastic product to form an assembly, e.g., an injection zipper puller assembly, also called as an injection zipper slider assembly, or a bead string assembly, which is widely used on clothes, luggage and bags. The plastic product can be formed on an end portion of the strap and manufactured by a single injection molding process.

However, since the strap is flexible and extendable, it is difficult to fix the end portion of the strap during the single injection molding process. A displacement of the end portion of the strap may cause the end portion of the strap to be exposed out of and not completely covered by the plastic product, which not only negatively affects aesthetic appearance and increases a defect rate but also makes the plastic product and the strap separate from each other easily.

For example, please refer to FIG. 16. FIG. 16 is a diagram of an assembly formed by a plastic product and a strap 1" in the prior art. As shown in FIG. 16, since an upper injection mold 51 and a lower injection mold 52 of an injection mold assembly only can clamp a left outer portion of the strap 1" outside a mold cavity 50, an end portion 10" of the strap 11" inside the mold cavity cannot be fixed, so that the end portion of the strap 11' might be displaced or deformed by the melted plastic material to move out of the surface of the plastic material during injection of the plastic material. Therefore, the assembly not only has a poor aesthetic appearance and increases a defect rate but also makes the plastic product and the strap 11" separate from each other easily.

SUMMARY OF THE INVENTION

Therefore, it is an objective of the present invention to provide a plastic product disposed on a strap with a better aesthetic appearance and an enhanced combination strength for solving the aforementioned problem.

In order to achieve the aforementioned objective, the present invention discloses a plastic product disposed on a strap. The strap is a soft string type textile. The plastic product includes a first injection molding portion and a second injection molding portion. The second injection molding portion is combined with the first injection molding portion to form the plastic product. An end portion of the strap protrudes out of the first injection molding portion and is completely covered by the second injection molding portion. A length of the first injection molding portion along a longitudinal direction of the strap is less than a length of the plastic product along the longitudinal direction of the strap, and a protruding length of the end portion of the strap protruding out of the first injection molding portion along the longitudinal direction of the strap is less than half of a thickness of the second injection molding portion along a radial direction of the strap perpendicular to the longitudinal direction of the strap.

According to an embodiment of the present invention, a parting line is formed on an outer surface of the plastic product.

According to an embodiment of the present invention, the thickness of the second injection molding portion along the radial direction of the strap is equal to a maximum thickness of the plastic product along the radial direction of the strap.

According to an embodiment of the present invention, a combining interface of the first injection molding portion and the second injection molding portion includes a flat surface structure or an inflection surface structure.

According to an embodiment of the present invention, a combining interface of the first injection molding portion and the second injection molding portion includes a step-shaped structure.

According to an embodiment of the present invention, the strap is a rope.

According to an embodiment of the present invention, the plastic product is formed in a shape of a zipper slider or a zipper puller.

According to an embodiment of the present invention, the first injection molding portion and the second injection molding portion are made of identical material.

According to an embodiment of the present invention, the thickness of the second injection molding portion along the radial direction of the strap is equal to a maximum thickness of the plastic product along the radial direction of the strap.

According to an embodiment of the present invention, a combining interface of the first injection molding portion and the second injection molding portion includes a flat surface structure or an inflection surface structure.

According to an embodiment of the present invention, a combining interface of the first injection molding portion and the second injection molding portion includes a step-shaped structure.

According to an embodiment of the present invention, the strap is a string.

According to an embodiment of the present invention, the plastic product is formed in a shape of a zipper slider or a zipper puller.

According to an embodiment of the present invention, the first injection molding portion and the second injection molding portion are made of identical material.

In summary, in the present invention, the plastic product is formed by the first injection molding portion and the second injection molding portion combined with the first injection molding portion. Furthermore, the length of the first injection molding portion along the longitudinal direction of the strap is less than the length of the plastic product along the longitudinal direction of the strap, and the protruding length of the end portion of the strap protruding out of the first injection molding portion is less than half of the thickness of the second injection molding portion along the radial direction of the strap perpendicular to the longitudinal direction of the strap. Therefore, the present invention can ensure the end portion of the strap to be completely covered by the first injection molding portion and the second injection molding portion and can solve a conventional problem that an end portion of a strap cannot be completely covered by a conventional plastic product. Besides, in the present invention, since the end portion of the strap is configured to protrude out of the first injection molding portion and completely be covered by the second injection molding portion, the end portion of the strap protruding out of the first injection molding portion and covered by the second injection molding portion can act as a fixing anchor, which not only enhances a combination strength of the first injection molding portion and the second injection molding portion but also enhances a combination strength of the plastic product and the strap. The present invention not only has a better aesthetic appearance and reduces a defect rate but also has enhanced combination strength for preventing the plastic product and the strap from separating from each other.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. The directional terminology is used for purposes of illustration and is in no way limiting. Accordingly, the drawings and descriptions will be regarded as illustrative in nature and not as restrictive.

Figure 1:
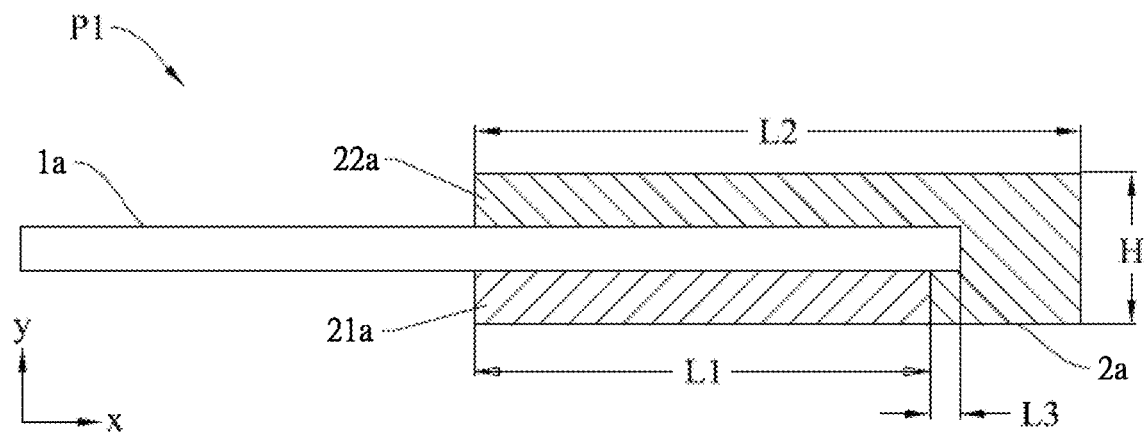
FIG. 1 is a sectional diagram of an assembly formed by a plastic product and a strap according to a first embodiment of the present invention.
Figure 2:
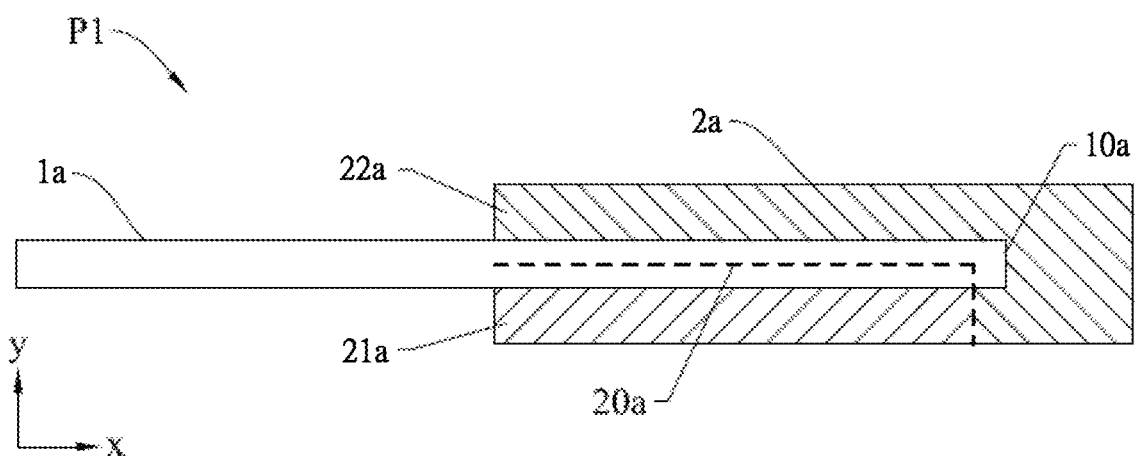
FIG. 2 is a sectional diagram illustrating a combining interface of a first injection molding portion and a second injection molding portion of the plastic product according to the first embodiment of the present invention.

Please refer to FIG. 1, FIG. 2 and FIG. 11 to FIG. 14. FIG. 1 is a sectional diagram of an assembly P1 formed by a plastic product 2a and a strap 1a according to a first embodiment of the present invention. FIG. 2 is a sectional diagram illustrating a combining interface 20a of a first injection molding portion 21a and a second injection molding portion 22a of the plastic product 2a according to the first embodiment of the present invention. FIG. 11 to FIG. 14 are diagrams of the assembly P1 at different views according to the first embodiment of the present invention. As shown in FIG. 1, FIG. 2 and FIG. 11 to FIG. 14, the assembly P1 is formed by the strap 1a and the plastic product 2a combined with the strap 1a. The strap 1a can be a soft string type textile. The plastic product 2a can cover an end portion 10a of the strap 1a and formed by the first injection molding portion 21a and the second injection molding portion 22a combined with the first injection molding portion 21a.

As shown in FIG. 1 and FIG. 2, the strap 1a has a first dimension along a longitudinal direction and a second dimension along a radial direction perpendicular to the longitudinal direction, and the first dimension is much greater than the second dimension. In other words, the strap 1a can have a greater length along an x-axis direction shown in FIG. 1 and FIG. 2 and a shorter radius along a y-axis direction shown in FIG. 1 and FIG. 2.

Furthermore, as shown in FIG. 1 and FIG. 2, the end portion 10a of the strap 1a protrudes out of the first injection molding portion 21a and completely covered by the second injection molding portion 22a.

Specifically, a length L1 of the first injection molding portion 21a along the longitudinal direction of the strap 1a is less than a length L2 of the plastic product 2a along the longitudinal direction of the strap 1a, and a protruding length L3 of the end portion 10a of the strap 1a protruding out of the first injection molding portion 21a along the longitudinal direction is less than half of a thickness H of the second injection molding portion 22a along the radial direction of the strap 1a perpendicular to the longitudinal direction of the strap 1a.

More specifically, the thickness H of the second injection molding portion 22a along the radial direction of the strap 1a can be equal to a maximum thickness of the plastic product 2a along the radial direction of the strap 1a. Furthermore, the length L2 of the plastic product 2a along the longitudinal direction of the strap 1a can be equal to a maximum length of the plastic product 2a along the longitudinal direction of the strap 1a.

As shown in FIG. 11 to FIG. 14, the plastic product 2a can be manufactured by a double injection molding process, i.e., the first injection molding portion 21a and the second injection molding portion 22a can be manufactured by two different injections, and therefore, a parting line 23a is formed on an outer surface of the plastic product 2a.

In this embodiment, as shown in FIG. 2, the combining interface 20a of the first injection molding portion 21a and the second injection molding portion 22a includes an inflection surface structure. Specifically, the combining interface 20a can include a first flat surface structure parallel to the longitudinal direction of the strap 1a and coincided with a central axis of the strap 1a and a second flat surface structure perpendicular to the longitudinal direction of the strap 1a, i.e., parallel to the y-axis direction, and connected to the first flat surface structure. In another embodiment, instead of the inflection surface structure, the combining interface of the first injection molding portion and the second injection molding portion can include a flat surface structure, a step-shaped structure or any other shape structure.

The first injection molding portion 21a and the second injection molding portion 22a can be made of plastic material or rubber material. Preferably, the first injection molding portion 21a and the second injection molding portion 22a can be made of identical material, so as to achieve an enhanced combination strength of the first injection molding portion 21a and the second injection molding portion 22a.

Specifically, the strap 1a can be a string. A radial cross section of the string can have a circular shape. The plastic product 2a can be formed in a shape of a zipper slider or a zipper puller. The assembly P1 can be an injection zipper puller assembly, also called as an injection zipper slider assembly, used on a cloth, a luggage and a bag for cooperating with a zipper.

Besides, the numbers of the plastic product, the first injection molding portion and the second injection molding portion are not limited to the this embodiment. In other words, according to practical demands, there can be one or more plastic products disposed on a strap, and the plastic product can include one or more first injection molding portions and one or more second injection molding portions. As shown in FIG. 10 to FIG. 14, in this embodiment, there can be only one plastic product 2a disposed on the end portion 10a of the strap 1a, and the plastic product 2a can be formed by two first injection molding portions 21a and one second injection molding portion 22a. In another embodiment, there can be two plastic products disposed on the end portion of the strap and separated from each other, and each plastic product can include one first injection molding portion and one second injection molding portion.

In addition, the shapes of the plastic product, the first injection molding portion, the second injection molding portion and the parting line are not limited to the aforementioned embodiments. It depends on practical demands and can be determined by an injection mold assembly.

Figure 15:
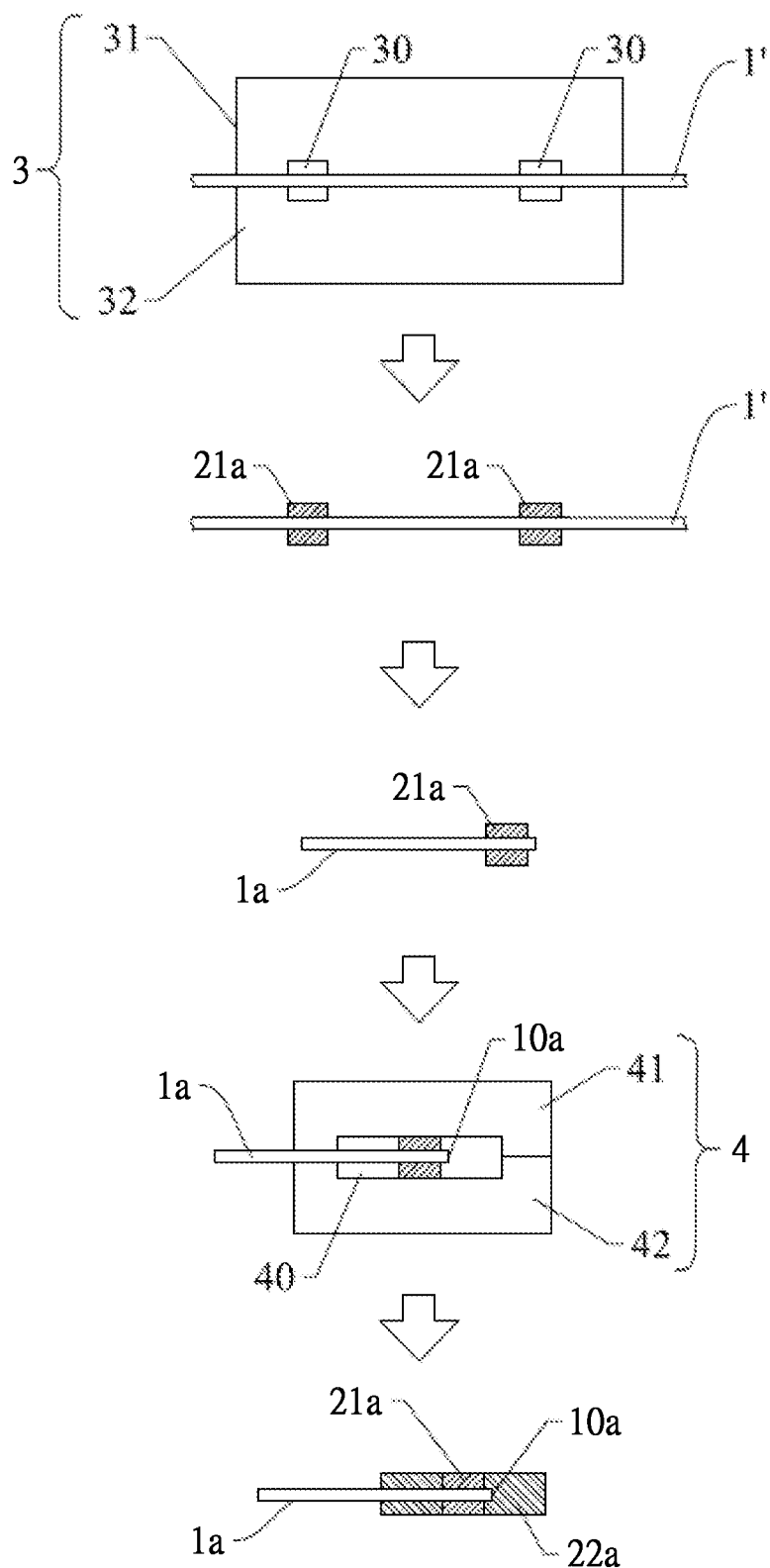
FIG. 15 is a flow chart of a method of disposing the plastic product on the strap according to the first embodiment of the present invention.
Figure 16:
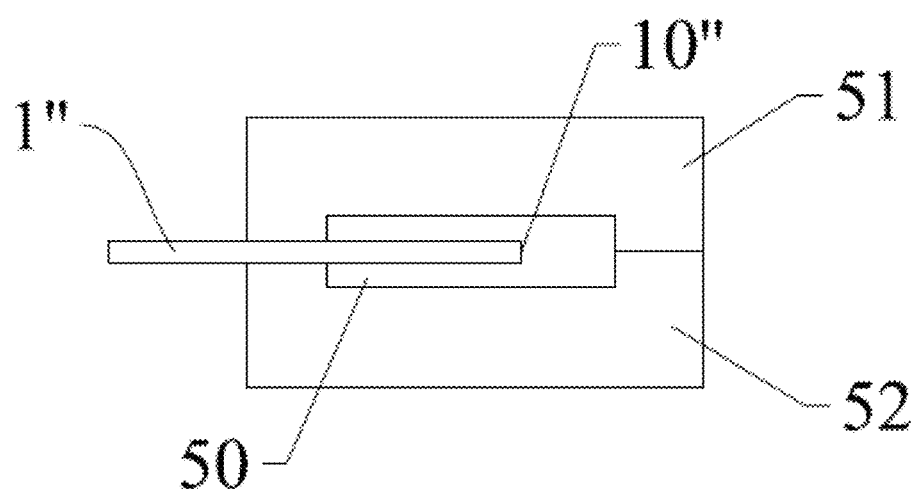
FIG. 16 is a diagram of an assembly formed by a plastic product and a strap in the prior art.

Please refer to FIG. 15. FIG. 15 is a flow chart of a method of disposing the plastic product 2a on the strap 1a according to the first embodiment of the present invention. As shown in FIG. 15, the method includes following steps:

Step S1: Place a continuous strap 1' between a first upper injection mold 31 and a first lower injection mold 32 of a first injection mold assembly 3, and inject melted plastic material into a mold cavity 30 formed between the first upper injection mold 31 and the first lower injection mold 32 to manufacture the first injection molding portion 21a on the continuous strap 1';

Step S2: Cut the continuous strap 1' to obtain the strap 1a having the end portion 10a protruding out of the first injection molding portion 21a; and Step S3: Place the end portion 10a of the strap 1a and the first injection portion 21a between a second upper injection mold 41 and a second lower injection mold 42 of a second injection mold assembly 4, and inject melted plastic material into a mold cavity 40 formed between the second upper injection mold 41 and the second lower injection mold 42 to manufacture the second injection molding portion 22a completely covering the end portion 10a of the strap 1a, so as to obtain the plastic product 2a disposed on the strap 1a.

In step S1, the first upper injection mold 31 and the first lower injection mold 32 can cooperatively clamp a left outer portion and a right outer portion of the continuous strap 1' outside the mold cavity 30, so as to tension the continuous strap 1', so that an inner portion of the continuous strap 1' inside the mold cavity 30 can be fixed, which ensures the first injection molding portion 21a to be formed at a predetermined position and in a predetermined shape. In step S3, the end portion 10a of the strap 1a attached with the first injection molding portion 21a has a certain stiffness and hardness and therefore cannot be displaced or deformed easily when the end portion 10a of the strap 1a attached with the first injection molding portion 21a is placed in the mold cavity 40, which prevents the end portion 10a of the strap 1a from moving out of a surface of the melted plastic material during injection of the plastic material, so as to ensure the end portion 10a of the strap 1a to be completely covered by the second injection molding portion 22a.

Figure 3:
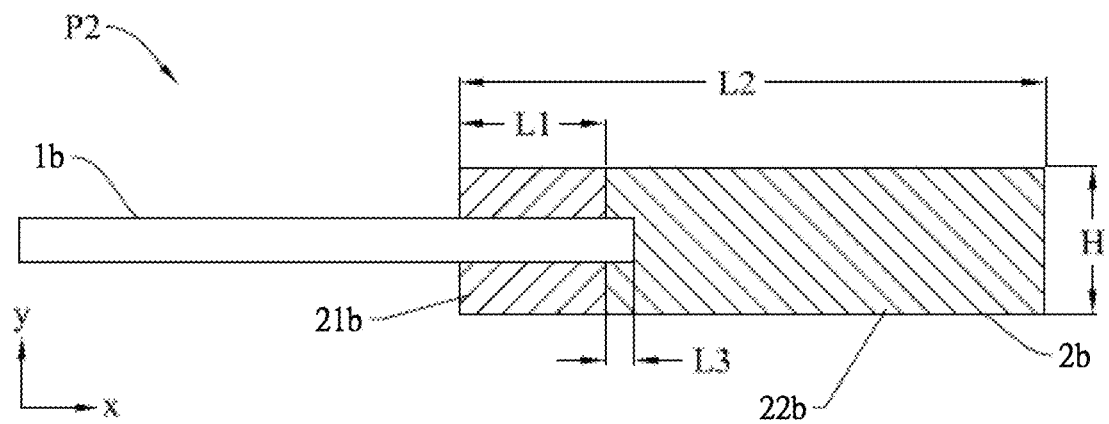
FIG. 3 is a sectional diagram of an assembly formed by a plastic product and a strap according to a second embodiment of the present invention.
Figure 4:
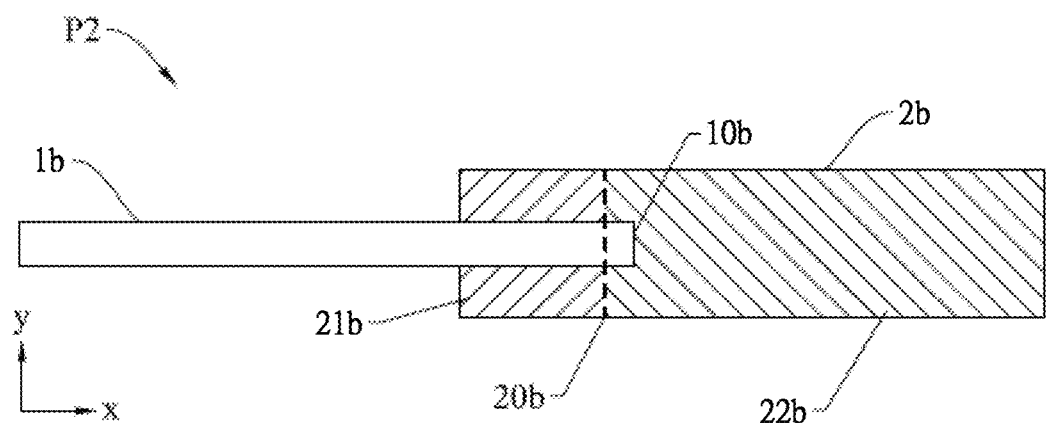
FIG. 4 is a sectional diagram illustrating a combining interface of a first injection molding portion and a second injection molding portion of the plastic product according to the second embodiment of the present invention.

Please refer to FIG. 3 and FIG. 4. FIG. 3 is a sectional diagram of an assembly P2 formed by a plastic product 2b and a strap 1b according to a second embodiment of the present invention. FIG. 4 is a sectional diagram illustrating a combining interface 20b of a first injection molding portion 21b and a second injection molding portion 22b of the plastic product 2 according to the second embodiment of the present invention. As shown in FIG. 3 and FIG. 4, the assembly P2 of this embodiment is similar to the assembly P1 of the first embodiment and has an end portion 10b covered by the plastic product 2b, but the shapes of the first injection molding portion 21b, the second injection molding portion 22b and the combining interface 20b of the first injection molding portion 21b and the second injection molding portion 22b of this embodiment are different from the ones of the first embodiment.

Specifically, as shown in FIG. 4, in this embodiment, the combining interface 20b can include a flat surface structure perpendicular to a longitudinal direction of the strap 1b, i.e., parallel to the y-axis direction.

Figure 5:
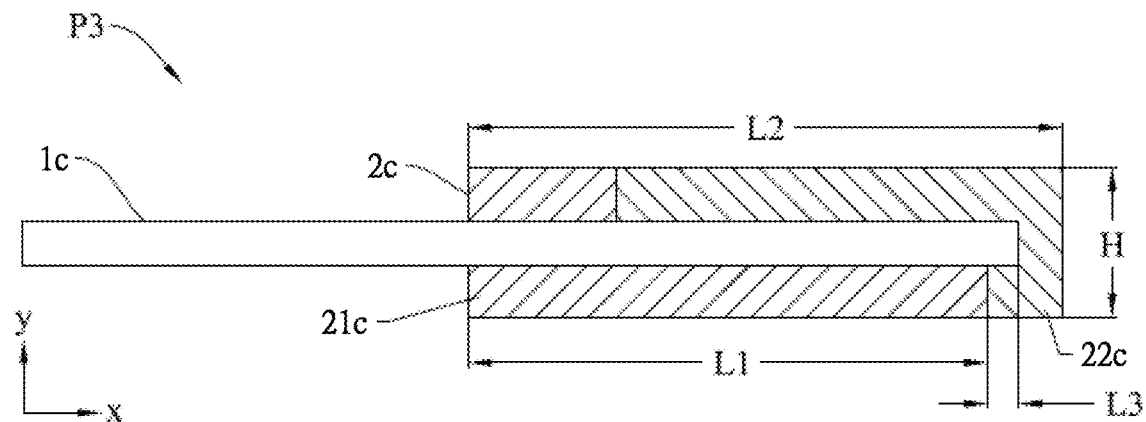
FIG. 5 is a sectional diagram of an assembly formed by a plastic product and a strap according to a third embodiment of the present invention.
Figure 6:
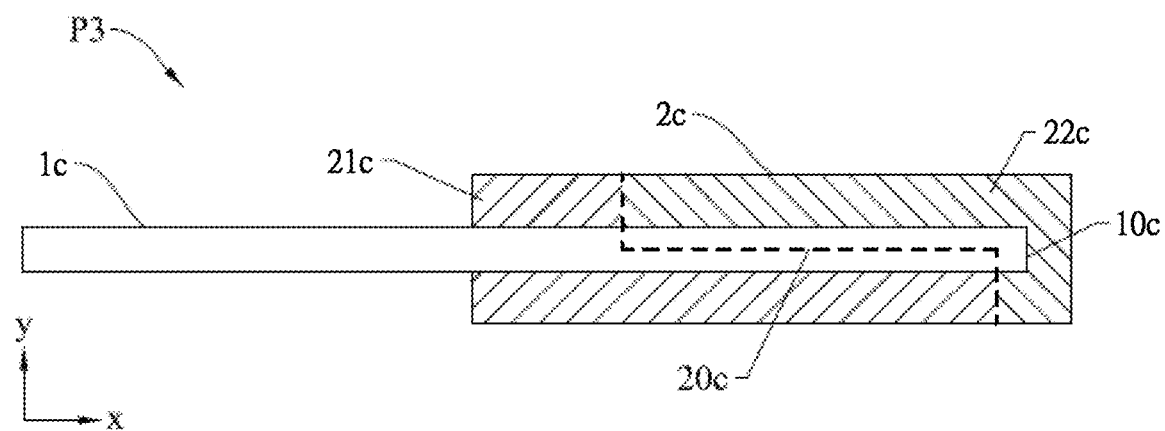
FIG. 6 is a sectional diagram illustrating a combining interface of a first injection molding portion and a second injection molding portion of the plastic product according to the third embodiment of the present invention.

Please refer to FIG. 5 and FIG. 6. FIG. 5 is a sectional diagram of an assembly P3 formed by a plastic product 2c and a strap 1c according to a third embodiment of the present invention. FIG. 6 is a sectional diagram illustrating a combining interface 20c of a first injection molding portion 21c and a second injection molding portion 22c of the plastic product 2c according to the third embodiment of the present invention. As shown in FIG. 5 and FIG. 6, the assembly P3 of this embodiment is similar to the assembly P1 of the first embodiment and has an end portion 10c covered by the plastic product 2c, but the shapes of the first injection molding portion 21c, the second injection molding portion 22c and the combining interface 20c of the first injection molding portion 21c and the second injection molding portion 22c of this embodiment are different from the ones of the first embodiment.

Specifically, as shown in FIG. 6, in this embodiment, the combining interface 20b can include a step-shaped structure which includes a first flat surface structure parallel to the longitudinal direction and coincided with a central axis of the strap 1b, and two second flat surface structures perpendicular to the longitudinal direction of the strap 1b, i.e., parallel to the y-axis direction, and connected to the flat surface structure.

Figure 7:
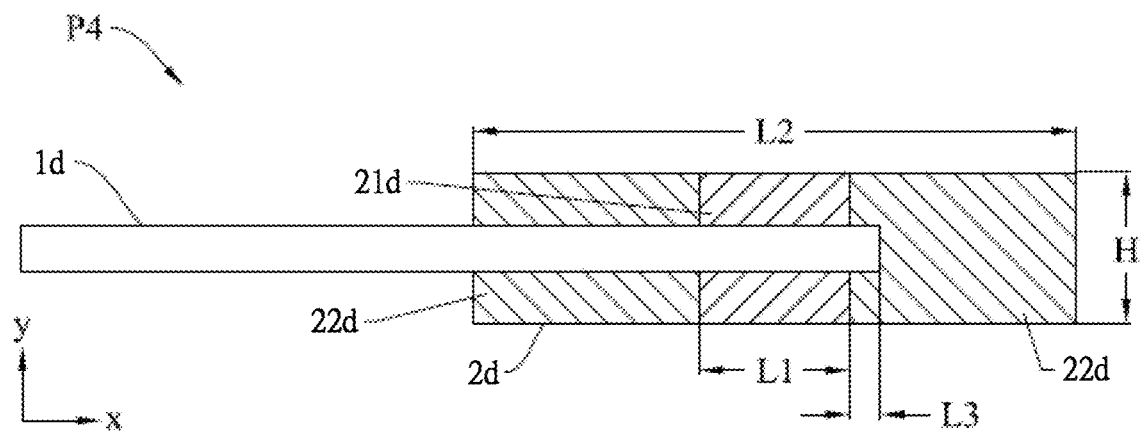
FIG. 7 is a sectional diagram of an assembly formed by a plastic product and a strap according to a fourth embodiment of the present invention.
Figure 8:
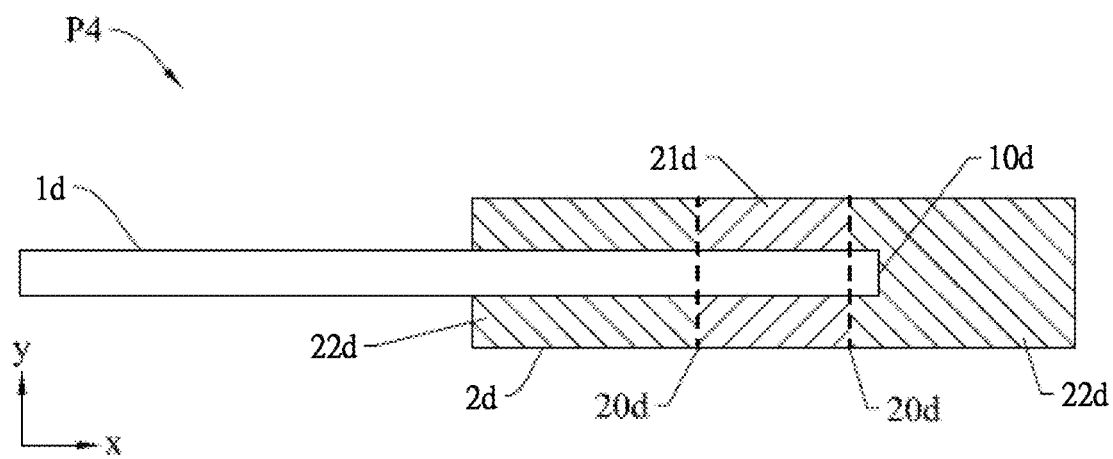
FIG. 8 is a sectional diagram illustrating a combining interface of a first injection molding portion and a second injection molding portion of the plastic product according to the fourth embodiment of the present invention.

Please refer to FIG. 7 and FIG. 8. FIG. 7 is a sectional diagram of an assembly P4 formed by a plastic product 2d and a strap 1d according to a fourth embodiment of the present invention. FIG. 8 is a sectional diagram illustrating a combining interface 20d of a first injection molding portion 21d and a second injection molding portion 22d of the plastic product 2d according to the fourth embodiment of the present invention. As shown in FIG. 7 and FIG. 8, the assembly P4 of this embodiment is similar to the assembly P1 of the first embodiment and has an end portion 10d covered by the plastic product 2d, but the shapes of the first injection molding portion 21d, the second injection molding portion 22*d* and the combining interface 20*d* of the first injection molding portion 21*d* and the second injection molding portion 22*d* of this embodiment are different from the ones of the first embodiment.

Specifically, as shown in FIG. 8, in this embodiment, the combining interface 20*b* can include two flat surface structures perpendicular to the longitudinal direction of the strap 1*d*, i.e., parallel to the y-axis direction.

Figure 9:
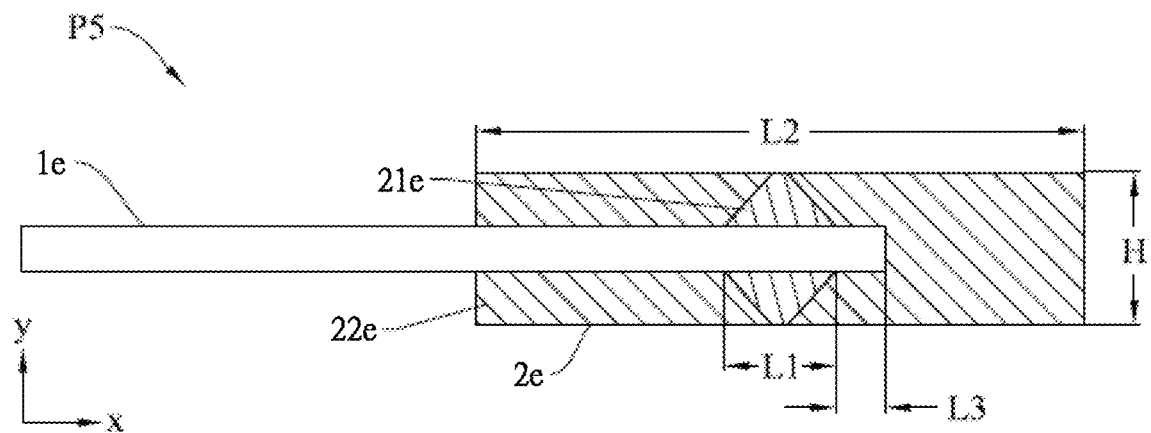
FIG. 9 is a sectional diagram of an assembly formed by a plastic product and a strap according to a fifth embodiment of the present invention.
Figure 10:
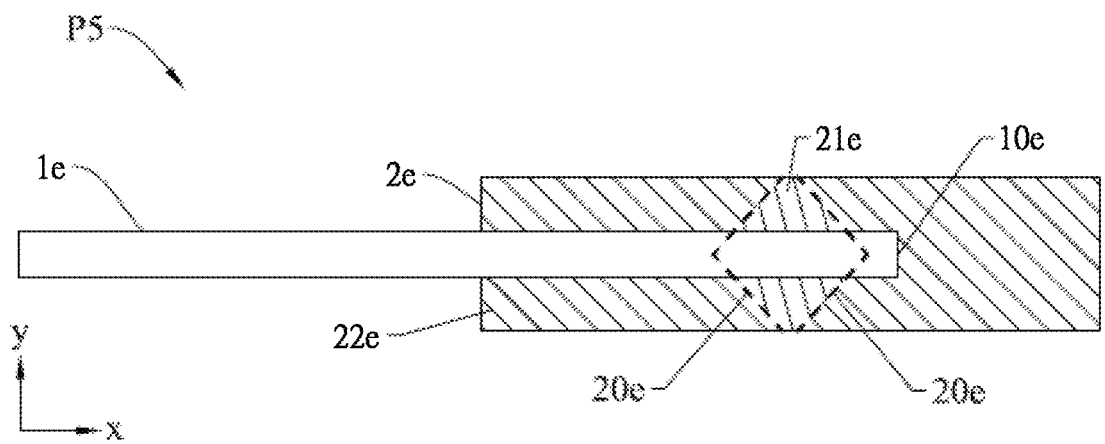
FIG. 10 is a sectional diagram illustrating a combining interface of a first injection molding portion and a second injection molding portion of the plastic product according to the fifth embodiment of the present invention.
Figure 11:
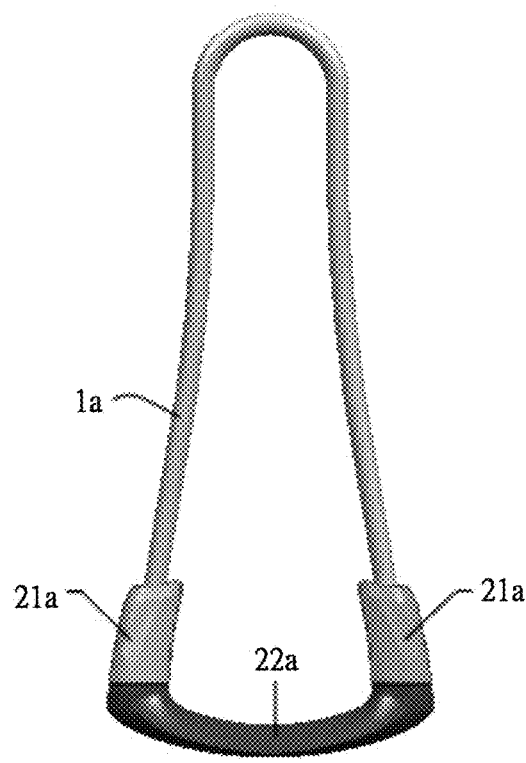
FIG. 11 to FIG. 14 are diagrams of the assembly at different views according to the first embodiment of the present invention.
Figure 12:
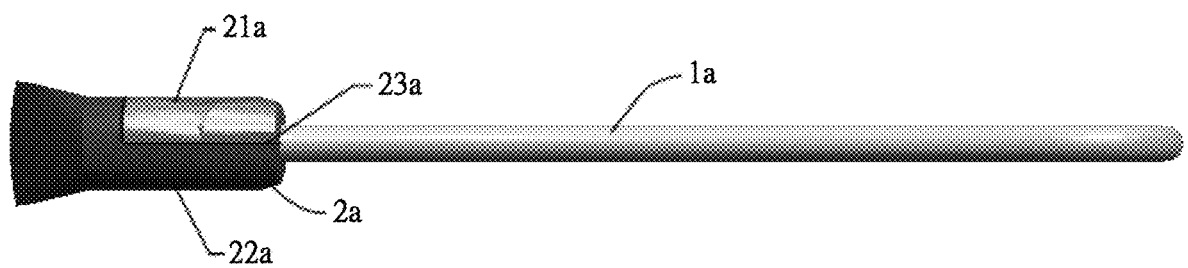
Figure 13:
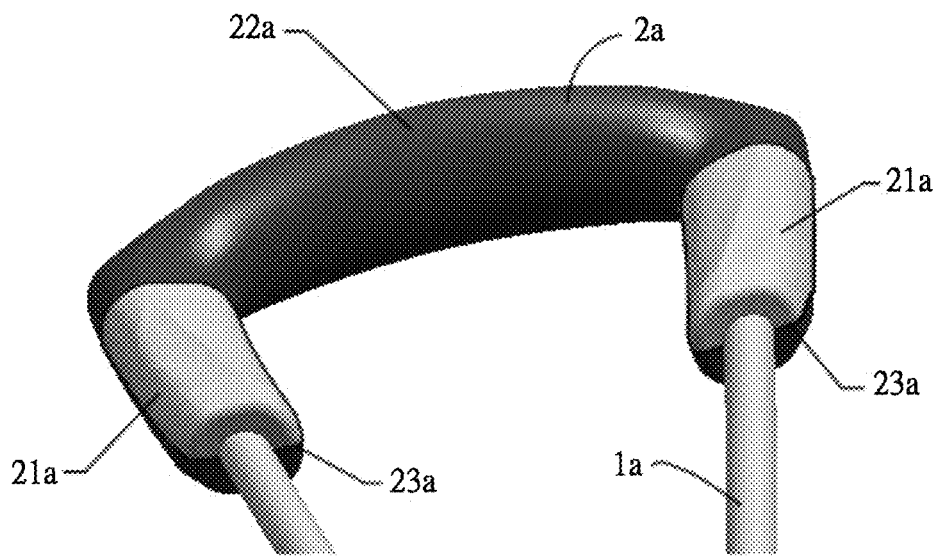
Figure 14:
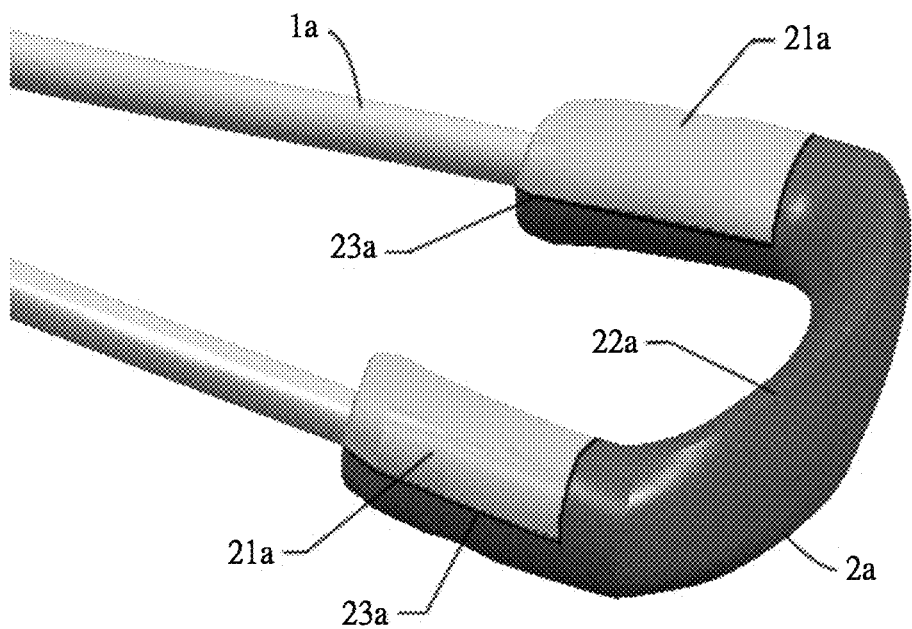

Please refer to FIG. 9 and FIG. 10. FIG. 9 is a sectional diagram of an assembly P5 formed by a plastic product 2*e* and a strap 1*e* according to a fifth embodiment of the present invention. FIG. 10 is a sectional diagram illustrating a combining interface 20*e* of a first injection molding portion 21*e* and a second injection molding portion 22*e* of the plastic product 2*e* according to the fifth embodiment of the present invention. As shown in FIG. 9 and FIG. 10, the assembly P5 of this embodiment is similar to the assembly P1 of the first embodiment and has an end portion 10*e* covered by the plastic product 2*e*, but the shapes of the first injection molding portion 21*e*, the second injection molding portion 22*e* and the combining interface 20*e* of the first injection molding portion 21*e* and the second injection molding portion 22*e* of this embodiment are different from the ones of the first embodiment.

Specifically, as shown in FIG. 10, in this embodiment, the combining interface 20*b* can include two inflection surface structures symmetrical to each other, and each inflection surface structure can include two inclined surface structure inclined to the longitudinal direction of the strap 1*e*, i.e., the x-axis direction, and connected to each other.

The different combining interfaces can provide different combining areas. The greater combining area can achieve the greater combination strength. For example, the combining interface 20*a* of the first embodiment, the combining interface 20*c* of the third embodiment, the combining interface 20*e* of the fifth embodiment have greater combining areas and therefore achieve the greater combination strengths. Besides, inflection portions of the combining interface 20*a* of the first embodiment, the combining interface 20*c* of the third embodiment, the combining interface 20*e* of the fifth embodiment can achieve locking effects, which also facilitates to enhance the combination strengths of the first injection molding portions and the second injection molding portions. Since the combining interface 20*b* of the second embodiment and the combining interface 20*d* of the fourth embodiment include the flat surface structures, the first injection mold assemblies for manufacturing the first injection molding portions can have simple structure.

In contrast to the prior art, in the present invention, the plastic product is formed by the first injection molding portion and the second injection molding portion combined with the first injection molding portion. Furthermore, the length of the first injection molding portion along the longitudinal direction of the strap is less than the length of the plastic product along the longitudinal direction of the strap, and the protruding length of the end portion of the strap protruding out of the first injection molding portion is less than half of the thickness of the second injection molding portion along the radial direction of the strap perpendicular to the longitudinal direction of the strap. Therefore, the present invention can ensure the end portion of the strap to be completely covered by the first injection molding portion and the second injection molding portion and can solve a conventional problem that an end portion of a strap cannot be completely covered by a conventional plastic product. Besides, in the present invention, since the end portion of the strap is configured to protrude out of the first injection molding portion and completely be covered by the second injection molding portion, the end portion of the strap protruding out of the first injection molding portion and covered by the second injection molding portion can act as a fixing anchor, which not only enhances a combination strength of the first injection molding portion and the second injection molding portion but also enhances a combination strength of the plastic product and the strap. The present invention not only has a better aesthetic appearance and reduces a defect rate but also has enhanced combination strength for preventing the plastic product and the strap from separating from each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A plastic product disposed on a strap, the strap being a soft string type textile, the plastic product comprising:
   a first injection molding portion; and
   a second injection molding portion, the second injection molding portion being combined with the first injection molding portion to form the plastic product;
   wherein an end portion of the strap protrudes out of the first injection molding portion and is completely covered by the second injection molding portion, a length of the first injection molding portion along a longitudinal direction of the strap is less than a length of the plastic product along the longitudinal direction of the strap, and a protruding length of the end portion of the strap protruding out of the first injection molding portion along the longitudinal direction of the strap is less than half of a thickness of the second injection molding portion along a radial direction of the strap perpendicular to the longitudinal direction of the strap.

2. The plastic product of claim 1, wherein a parting line is formed on an outer surface of the plastic product.

3. The plastic product of claim 2, wherein the thickness of the second injection molding portion along the radial direction of the strap is equal to a maximum thickness of the plastic product along the radial direction of the strap.

4. The plastic product of claim 2, wherein a combining interface of the first injection molding portion and the second injection molding portion comprises a flat surface structure or an inflection surface structure.

5. The plastic product of claim 2, wherein a combining interface of the first injection molding portion and the second injection molding portion comprises a step-shaped structure.

6. The plastic product of claim 2, wherein the strap is a string.

7. The plastic product of claim 2, wherein the plastic product is formed in a shape of a zipper slider or a zipper puller.

8. The plastic product of claim 2, wherein the first injection molding portion and the second injection molding portion are made of identical material.

9. The plastic product of claim 1, wherein the thickness of the second injection molding portion along the radial direction of the strap is equal to a maximum thickness of the plastic product along the radial direction of the strap.

10. The plastic product of claim 1, wherein a combining interface of the first injection molding portion and the second injection molding portion comprises a flat surface structure or an inflection surface structure.

11. The plastic product of claim 1, wherein a combining interface of the first injection molding portion and the second injection molding portion comprises a step-shaped structure.

12. The plastic product of claim 1, wherein the strap is a string.

13. The plastic product of claim 1, wherein the plastic product is formed in a shape of a zipper slider or a zipper puller.

14. The plastic product of claim 1, wherein the first injection molding portion and the second injection molding portion are made of identical material.

* * * * *